United States Patent [19]

Chang

[11] 4,195,689

[45] Apr. 1, 1980

[54] CHEMICAL WATERFLOOD PROCESS DEVELOPMENT

[75] Inventor: Harry L. Chang, Tulsa, Okla.

[73] Assignee: Cities Service Company, Tulsa, Okla.

[21] Appl. No.: 958,277

[22] Filed: Nov. 6, 1978

[51] Int. Cl.² .............................................. E21B 43/22
[52] U.S. Cl. ..................................... 166/246; 166/273
[58] Field of Search ................. 166/246, 273, 274, 252

[56] References Cited

U.S. PATENT DOCUMENTS

| | | | |
|---|---|---|---|
| 3,707,187 | 12/1972 | Knight | 166/273 X |
| 3,724,545 | 4/1973 | Knight | 166/273 |
| 3,844,350 | 10/1974 | Knight et al. | 166/273 |
| 3,850,244 | 11/1974 | Rhudy et al. | 166/273 |
| 3,919,092 | 11/1975 | Norton et al. | 166/273 X |
| 4,008,766 | 2/1977 | Savins | 166/273 |
| 4,011,910 | 3/1977 | Rhudy et al. | 166/274 |
| 4,018,281 | 4/1977 | Chang | 166/273 |
| 4,039,028 | 8/1977 | Knight | 166/246 |

*Primary Examiner*—Stephen J. Novosad
*Attorney, Agent, or Firm*—Richard D. Stone

[57] ABSTRACT

A waterflood process wherein a slug of biopolymer is injected into a formation, followed by a slug of synthetic polymer. The biopolymer slug protects the synthetic polymer from degradation due to presence of salts or surfactants in the formation.

7 Claims, No Drawings

CHEMICAL WATERFLOOD PROCESS DEVELOPMENT

BACKGROUND OF THE INVENTION

1. Field of the Invention

This invention relates to the injection of two different types of aqueous solutions of polymers into a subterranean oil-bearing formation.

2. Description of the Prior Art

The petroleum industry recognized the problem of inefficient oil recovery by conventional primary and secondary recovery methods, i.e., water flooding, early in the 20th Century. Since then, extensive research on improvement of displacement and sweep efficiency in petroleum recovery has been conducted. Many different types of processes have been designed to reduce residual oil saturation by improving displacement efficiency.

Polymer flooding works by improving sweep efficiency by improving the mobility ratio. The mobility ratio is the ratio of the relative mobility of the polymer slug and the total relative mobility of the displaced phase, usually an oil bank but occasionally an oil-water bank.

In general, use of thickened water gives improved oil recovery because the thickened water is less likely to "finger" through the oil-bearing formation. The net result is that a greater percentage of the oil-bearing formation is swept with thickened water, resulting in enhanced recovery.

Polymer flooding will get oil out of the ground more quickly than simple water flooding, but will not significantly reduce residual oil saturation over that obtainable with conventional water flooding.

It is also possible to increase recovery by addition of a surface-active agent ahead of, or mixed in with, the thickened water to improve oil recovery. Use of surface-active agents reduces the surface tension between oil and water, and can lead to very high oil recoveries. These methods using surfactants, also called tertiary recovery methods, usually require use of a thickened drive water to ensure efficient displacement of produced oil.

A thorough review of polymer flooding technology was presented at the Fifth Symposium on Improved Methods for Oil Recovery of the Society of Petroleum Engineers of AIME, held in Tulsa, Oklahoma, April 16–19, 1978, SPE Paper No. 7043, Polymer Flooding Technology-Yesterday, Today and Tomorrow, Page 55, PROCEEDINGS. The teachings of this paper are incorporated by reference.

In general, two different types of water thickening agents are used.

Synthetic polymers, such as high molecular weight, partially hydrolyzed polyacrylamides, are well known. Other similar viscosity increasing agents include naturally occurring gums, synthetic polymers, including co-polymers, sucrose, crude sugar and similar materials.

Although some natural materials are included, the synthetic polymers are the ones most frequently used in this group, and all are referred to hereafter as synthetic polymers.

The second variety of water thickening agent which is used is a heteropolysaccharide produced by fermentation of carbohydrates by bacteria of the genus Xanthomonas. These are frequently called biopolymers or Xanthan gums.

These two types of water thickening agents, namely synthetic polymer and biopolymer, each have unique advantages and failings.

The synthetic polymers, e.g., polyacrylamides, are relatively inexpensive. They are easy to inject into a well, i.e., they do not tend to plug up the rock or sand formation near the injection well. Unfortunately, the synthetic polymers degrade when subjected to shearing. The bonds between molecules of polyacrylamides are very weak, and mechanical shearing can destroy some of these bonds and degrade the polymer.

Another disadvantage of synthetic polymers is their reaction to salt. The viscosity and mobility characteristics of synthetic polymers are severely degraded when salt is present. It is believed that the addition of salt to polymer solutions changes the shape of the molecules from a somewhat distended shape to one more nearly spherical.

This degradation is a serious problem whenever significant amounts of naturally occurring brine will be present in a reservoir. In many tertiary recovery systems, a certain amount of salt is added to the surface active system to increase oil recovery. Almost inevitably the salts, added to the fluid containing surface active agents, eventually degrade some synthetic polymer which is added to the drive water.

Biopolymers have excellent resistance to shear degradation, and experience much less reduction in viscosity when salts are present, as compared to synthetic polymers.

Unfortunately, the biopolymers are relatively expensive and have a tendency of plugging some rock formations. The reason for the plugging is not completely understood, it may be due to large clumps or conglomorations of biopolymer, or may be due to production of some biopolymer with bacteria cell bodies which does not flow well in a particular rock formation.

The injectibility of biopolymer can be improved by filtering through diatomaceous earth, but this adds significantly to the cost of an enhanced recovery process, and attempts are made to minimize the amount of biopolymer, and amount of filtration required.

The properties of the two different types of polymers may be summarized as follows:

| COMPARISON OF POLYMERS | | |
| --- | --- | --- |
| | Synthetic | Biopolymers |
| Cost | Low | High |
| Max. Temp. Limit | 200° F. | 160° F. |
| Shear Stability | Low | High |
| Salinity Tolerance | Low | High |
| Bio-Degradability | Low | High |
| Plugging Tendency | Low | High |

Both types of polymers are non-Newtonian.

Rhudy, et al., U.S. Pat. No. 4,011,910 (U.S. Class 166/274), the teachings of which are incorporated by reference, recognized some of the problems discussed above. Rhudy was trying to obtain a substantial permeability reduction of the formation rocks. The patentee used a first polymer solution with a very high molecular weight polymer, at least about 10,000,000, to reduce permeability. A second solution was used which contained much lower molecular weight polymer, less than 10,000,000, which would impart increased viscosity without substantially affecting formation permeability.

Rhudy's first polymer reduced the permeability of the rocks, but in so doing lost much of its effectiveness as a water thickening agent. Rhudy's second polymer did nothing to change rock permeability, but did remain effective.

A specific example, Case 2 of this patent, showed use of a synthetic polymer followed by a biopolymer.

Knight, U.S. Pat. No. 4,039,028 (U.S. Class 166/246), the teachings of which are incorporated by reference, also recognized more of the problems peculiar to synthetic versus biopolymers.

Knight's solution was to use a mixture of synthetic and biopolymers. This all-purpose polymer would be suitable for use in the presence of either fresh water or brine, and be relatively immune to shear degradation.

Knight recognized that neither shear nor salt had an appreciable affect on the viscosity of biopolymers. For this reason, the patentee taught that a mixture of biopolymers with polyacrylamides gave superior resistance to viscosity reduction by either increased salt content or by shear, at least as compared to a solution of polyacrylamide alone.

Unfortunately, none of the solutions suggested by the prior art have been completely satisfactory. Use of a synthetic polymer followed by a biopolymer, as suggested by Rhudy, et al., does not work well in formations where brine will be encountered. Brine may be encountered either as part of the connate water in a formation, or as part of the surfactant system used in many tertiary recovery processes. The brine will reduce the viscosity of the synthetic polymer, and increase the tendency of the synthetic polymer solution to finger through the formation.

A mixture of two polymers, as suggested by Knight, is not satisfactory because the salt destroys the effectiveness, to a great extent, of the synthetic polymer, leaving biopolymer as the major effective component of the mixture.

SUMMARY OF THE INVENTION

I have discovered a way to avoid the deficiencies of the prior art methods. The solution is to inject, sequentially, biopolymer followed by synthetic polymer.

Accordingly, the present invention provides an improved process for recovering oil from an oil bearing subterranean formation wherein a thickened water is injected into the formation through an injection well and displaced toward a production well in fluid communication with the formation, the improvement comprising injecting 0.03 to 0.5 pore volumes of water containing 100 to 2,500 wt. ppm of a biopolymer, and then injecting 0.27 to 1.0 pore volumes of water containing 100 to 2,500 wt. ppm synthetic polymer.

In another embodiment, especially useful in tertiary recovery methods, the present invention provides an improved process for recovering oil from an oil bearing subterranean formation wherein a surfactant system is injected into the formation through an injection well and displaced toward a production well in fluid communication with the formation, the improvement comprising injecting after the surfactant system has been injected, from 0.03 to 0.5 pore volumes of water containing 100 to 2,500 wt. ppm of a biopolymer, and then injecting 0.27 to 1.0 pore volumes of water containing 100 to 2,500 wt. ppm synthetic polymer.

DETAILED DESCRIPTION

The biopolymers which may be used in the present invention are polysaccharides produced by the fermentation of carbohydrates by bacteria of the genus Xanthomonas.

Synthetic polymers which can be used in the practice of the present invention include water soluble, high molecular weight, unhydrolyzed or partially hydrolyzed polyacrylamides.

Surfactant systems which may be used in enhanced recovery processes are many. A review of several different surfactant flooding systems was presented at the SPE Symposium previously mentioned, as SPE Paper No. 7041, Micellar/Polymer Flooding—An Overview, the teachings of which are incorporated herein by reference, provides a broad description of different surfactant systems which can benefit from the practice of the present invention. This paper also indicates the salinity to be encountered in many formations. Of course, the connate water salinity does not necessarily determine the salinity of the surfactant solution, because it is possible to pre-flush a formation with fresh or salt water to alter the salinity encountered in the connate formation, but such salinity adjustments add to the cost and complexity of an enhanced recovery process. Frequently an attempt will be made to select a surfactant system which will be fairly compatible with the salinity expected in the formation.

Using the present invention, it will be possible to maximize oil recovery while minimizing the cost of expensive polymers used to thicken water. It will also be possible to use surfactant systems which give optimum oil recovery, without regard to their deleterious effect on synthetic polymer solutions, because a slug of biopolymer will safely separate the two solutions.

Surfactant systems can be classified in many ways, one broad classification is whether the system is an oil external microemulsion or a water external microemulsion.

In general terms, most oil external microemulsions use fairly concentrated surfactant systems. The composition of a typical oil external system, consisting of 50 liquid volume %, LV%, micellar oil or soluble oil and 50 LV% micellar water, is presented in Table I.

TABLE I

| Fluid | Description | Weight Percent |
|---|---|---|
| Micellar Oil | | |
| | Four sodium alkyl aryl sulfonates (Equivalent weight 250–650; Average equivalent weight 425) | 23.85[a] |
| | Ethylene glycol monobutyl ether | 2.63 |
| | Crude oil | 66.78 |
| | Fresh water added | 6.74[b] |
| Micellar Water | | |
| | Sodium chloride | 0.25 |
| | Nitrilotriacetic acid trisodium salt | 0.65 |
| | Fresh water | 99.10 |

[a] About 52 percent sodium sulfonate.
[b] Does not include the water in the petroleum sulfonates.

The other type of surfactant system, namely water external, uses much lower concentrations of surface active agents, and generally requires significantly more salt addition than does an oil external system. The composition of a typical water external solution is presented in Table II.

TABLE II

| Composition of Micellar Solution | |
|---|---|
| Description | Weight Percent |
| Two sodium alkyl aryl sulfonates (Equivalent weight 300-550; Average equivalent weight 430) | 4.69[a] |
| $C_{12}$-$C_{15}$ Alcohol ethoxysulfate sodium salt (about 60% active) | 1.13 |
| Secondary butyl alcohol | 4.13 |
| Polysaccharide | 0.09 |
| Sodium chloride | 0.70 |
| Fresh water added | 89.26[b] |

[a]About 56 percent sodium sulfonate.
[b]Does not include water in the sulfonates.

The present invention is useful with either system, but is especially beneficial when used in conjunction with a water external surfactant system which contains significant amounts of salts.

Regardless of the type of surfactant system selected, the surfactant flood will be followed by a polymer flood and then a water flood. The practice of the present invention permits the biopolymer solution, which is the first polymer solution injected, to act as a buffer zone to isolate and protect the synthetic polymer solution. The biopolymer drives most of the salt encountered in the formation before it which permits very effective use of the less expensive synthetic polymers. It also minimizes the amount of biopolymer which must be added and minimizes problems of plugging or diatomaceous earth filtration which may be encountered when using biopolymers.

EXAMPLES

A number of laboratory tests were made to check the compatibility of various surfactant systems with biopolymers and synthetic polymers.

EXAMPLE 1

The viscosity behavior of a 900 ppm biopolymer, purchased from Abbott Laboratories, solution prepared in El Dorado lake water was tested. The El Dorado lake water contained 50 ppm salts. The biopolymer solution was mixed with varying amounts of surfactant system, and the viscosity of the mixture determined with a Brookfield viscometer, with UL adapter, at 6 rpm. The results are presented in Table III.

TABLE III

| DILUTION OF BIOPOLYMER WITH OIL EXTERNAL SURFACTANT SOLUTION | | |
|---|---|---|
| Volume % Surfactant Mixture | ppm Biopolymer Present | Viscosity |
| 0.00% | 900 ppm | 27.8 cp |
| 6.01% | 846 ppm | 25.5 cp |
| 11.97% | 792 ppm | 24.8 cp |
| 24.92% | 676 ppm | 23.0 cp |
| 35.06% | 584 ppm | 12.5 cp |
| 50.00% | 450 ppm | 7.0 cp |
| 60.00% | 360 ppm | 9.3 cp |
| 70.00% | 270 ppm | 14.5 cp |
| 80.00% | 180 ppm | 45.0 cp |
| 90.00% | 90 ppm | 30.4 cp |
| 100.00% | 0 ppm | 23.8 cp |

EXAMPLE 2

Similar experiments were conducted with the water external surfactant system, without 0.09% by weight of polysaccharide, prepared so that it contained 900 ppm synthetic polymer, in this instance a polyacrylamide obtained from Nalco Chemical Company. The 900 ppm calculation is based upon active polyacrylamide.

Tests were conducted in a Brookfield viscometer at several rpms, to give various shear rates, the most significant data point being operation at 6 rpm which would be consistent with that used in Example I. Data are presented in Table IV.

TABLE IV

| WATER EXTERNAL SURFACTANT | |
|---|---|
| Polymer: 900 ppm (active) Nalco Polyacrylamide #4276 | |
| Brookfield Speed, rpm | Viscosity |
| 60 rpm | 8.3 cp |
| 30 rpm | 9.4 cp |
| 12 rpm | 10.8 cp |
| 6 rpm | 11.7 cp |
| 3 rpm | 12.4 cp |

Even with 900 ppm of synthetic polymer the viscosity, measured at 6 rpm, was only 11.7 cp. The viscosity of a pure water solution of 900 ppm (active) polyacrylamide would be around 80 cp, indicating that there has been a severe degradation of polymer properties due to contact with the surfactant system. It is believed that most of the degradation is due to the salt content of the surfactant, though undoubtedly the sulfonates, or perhaps other ingredients of the surfactant system, have a bad effect on the synthetic polymer.

EXAMPLE 3

This example illustrates the behavior of a water external surfactant system containing 900 ppm of Abbott biopolymer when it is diluted with a 900 ppm synthetic polymer solution. The biopolymer was identical to the biopolymer used in Example 1. The synthetic polymer is identical to that used in Example 2. Data are presented in Table V.

TABLE V

| WATER EXTERNAL SURFACTANT DILUTED WITH SYNTHETIC POLYMER | | | |
|---|---|---|---|
| Volume % 900 ppm (active) Nalco Polyacrylamide #4276 Solution Present | ppm Polymer | | Viscosity* |
| | Synthetic (Nalco) | Biopolymer (Abbott) | |
| 0.0 | 0.0 | 900 | 29.8 cp |
| 10 | 90 | 810 | 27.8 cp |
| 20 | 180 | 720 | 25.9 cp |
| 30 | 270 | 630 | 24.0 cp |
| 40 | 360 | 540 | 22.9 cp |
| 50 | 450 | 450 | 22.5 cp |
| 60 | 540 | 360 | 23.2 cp |
| 70 | 630 | 270 | 24.9 cp |
| 80 | 720 | 180 | 31.2 cp |
| 90 | 810 | 90 | 41.6 cp |
| 100 | 900 | 0 | 88.9 cp |

*Brookfield LVT viscometer with UL adapter (at 6 rpm).

From this table it is evident that there is no harmful effect noted on system viscosity when both types of polymer contact the surfactant system.

Example 3 does not represent the present invention. Commercially, the surfactant system would be injected into a well, followed by a sufficient amount of biopolymer solution to minimize contact between the surfactant system and synthetic polymer. The synthetic polymer is, of course, injected after biopolymer.

The biopolymer solution may be prepared using fresh soft water, or may be prepared to contain some significant amount of salts, typically from 0.1 to 2 wt. % salts. The presence of salts may be necessary in at least some portion of the biopolymer solution to maintain optimum activity of a surfactant system. Many surfactants require the presence of salt for optimum operation. When the surfactant mixes with biopolymer, the surfactant is diluted as is the salt content of the system. Nonoptimum salt content further impairs the effect of the surfactant. By using a biopolymer which contains salts, brine dilution can be avoided resulting in improved operation of the surfactant system. The surfactant will still be diluted somewhat by the biopolymer, but the salt concentration of the mixture will be the same, approximately, as that of the starting surfactant.

The presence of salts, and especially of calcium and magnesium, is to be avoided in the biopolymer solution which will be in contact with or near synthetic polymer solution. The biopolymers tolerate these salts fairly well, but their presence in the biopolymer solution would lead to severe loss of viscosity of the synthetic polymer solution in the mixing zone.

There is a clash between the salt requirements of some surfactant systems and the synthetic polymer. I have discovered a way to accomodate the different, indeed opposing, brine requirements of synthetic polymer and some surfactant systems.

When using a surfactant system which requires a significant amount of salinity, the optimum way to practice the present invention is to use a biopolymer solution containing sufficient salts to maintain surfactant salinity during the initial portion of the biopolymer solution injection phase. The biopolymer can be prepared in batches, or continously, with a tapering salt content, so that the biopolymer has a diminished, or non-existent, salt content at the end of the biopolymer injection period. At this time, the synthetic polymer can be added to the system without fear of loss of viscosity due to salts in the formation rock, surfactant system, or initial portion of the biopolymer slug.

An example of a tapered slug would be injection of 0.1 pore volumes of biopolymer containing 2 wt. % salts, followed by 0.1 pore volumes of biopolymer made with soft water.

The amounts of each type of polymer which will be added to a formation depend on a number of factors. The amount of salt, whether initially present in the formation or added with the surfactant system, and the degree of heterogeneity of the reservoir are prime factors. The more salt that is present and the more heterogeneous the reservoirs the more biopolymer will be required to act as a buffer.

Good results can be obtained from the practice of the present invention when the biopolymer slug or slugs comprises 10–50% of the total polymer solution used, with synthetic polymer making up the remaining 90–50%.

Expressed as pore volume, of an oil-bearing formation, the biopolymer solution should be about 0.03 to 0.50 pore volumes. The synthetic polymer injection should be 0.27 to 1.0 pore volumes for total polymer slug sizes ranging from 0.30 to 1.5 pore volume. If a tapered salinity biopolymer injection is practiced, the amount of biopolymer used will be increased somewhat, but usually the total amount injected will be within the guidelines given above.

I claim:

1. In a process for recovering oil from an oil bearing subterranean formation wherein a surfactant system is injected into the formation through an injection well and displaced toward a production well in fluid communication with the formation, the improvement comprising injecting after the surfactant system has been injected, from 0.03 to 0.5 pore volumes of water containing 100 to 2,500 wt. ppm of a biopolymer, and then injecting 0.27 to 1.0 pore volumes of water containing 100 to 2,500 wt. ppm partially hydrolyzed polyacrylamide.

2. Process of claim 1 wherein the surfactant system comprises an oil external micro-emulsion.

3. Process of claim 1 wherein the surfactant system comprises a water external micro-emulsion.

4. Process of claim 1 wherein the polymer injection is followed by injection of a drive fluid to displace the polymer toward the production well.

5. Process of claim 1 wherein the biopolymer slug contains a tapering salinity content.

6. Process of claim 1 wherein the biopolymer is a heteropolysaccharide produced by the species Xanthomonas campestris.

7. Process of claim 1 wherein the water containing biopolymer contains 250 to 1,500 wt. ppm biopolymer and the water containing synthetic polymer contains 250 to 1,500 wt. ppm synthetic polymer.

* * * * *